United States Patent

[11] 3,584,833

| [72] | Inventor | Wilfred Joseph Grenier<br>Rutland, Mass. |
|---|---|---|
| [21] | Appl. No. | 835,097 |
| [22] | Filed | June 20, 1969 |
| [45] | Patented | June 15, 1971 |
| [73] | Assignee | General Industries, Incorporated<br>Worcester, Mass. |

[54] SHEET METAL TWO-PART VALVE HOUSING
1 Claim, 6 Drawing Figs.

[52] U.S. Cl. ..................................... 251/315,
251/366
[51] Int. Cl. ...................................... F16k 5/06
[50] Field of Search ........................... 137/480;
251/366; 285/382; 251/367

[56] References Cited
UNITED STATES PATENTS

| 1,975,925 | 10/1934 | Compo ...................... | 285/382 X |
| 2,270,926 | 1/1942 | Briegel et al. ................ | 285/382 X |
| 3,292,656 | 12/1966 | Armstrong .................... | 137/480 |
| 3,430,647 | 3/1969 | Suchowolec .................. | 137/377 |
| 3,438,387 | 4/1969 | Scaramucci .................. | 251/315 X |

FOREIGN PATENTS

| 3,402 | 2/1896 | Great Britain ................ | 251/366 |

Primary Examiner—M. Cary Nelson
Assistant Examiner—Michael O. Sturm
Attorney—Joseph S. Iandiorio ABSTRACT: A two-part, sheet metal valve housing in which the metal grain is continuous and is aligned with the contours of the parts and an apparatus and process for making it.

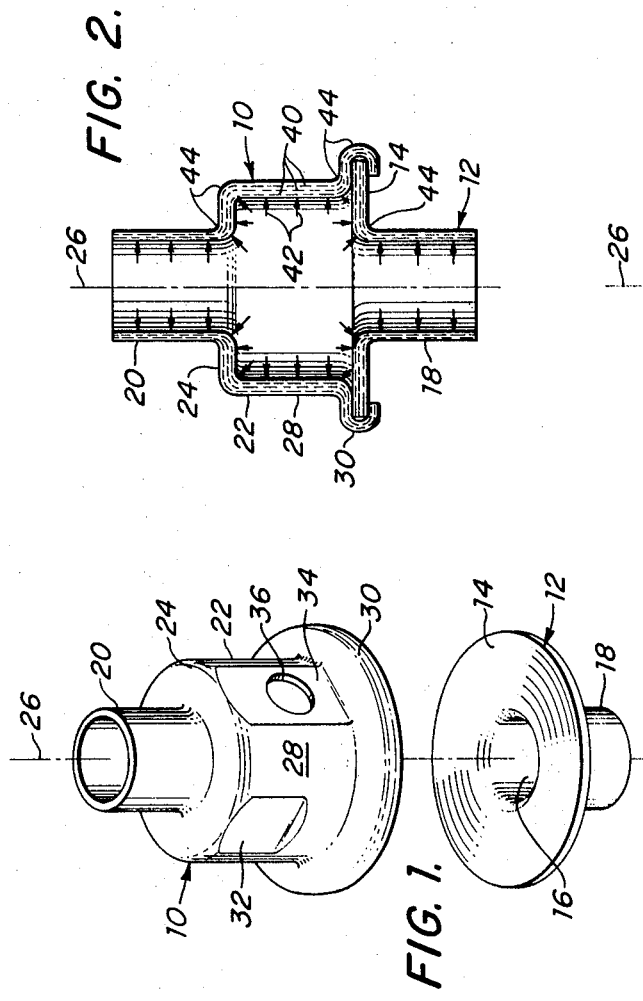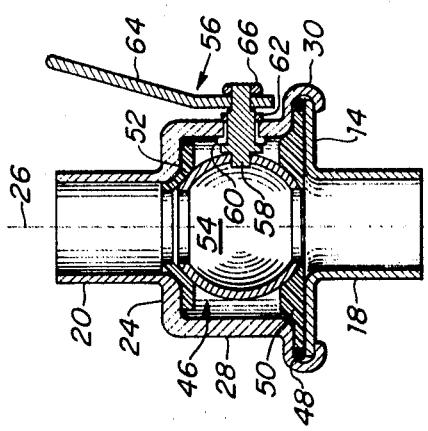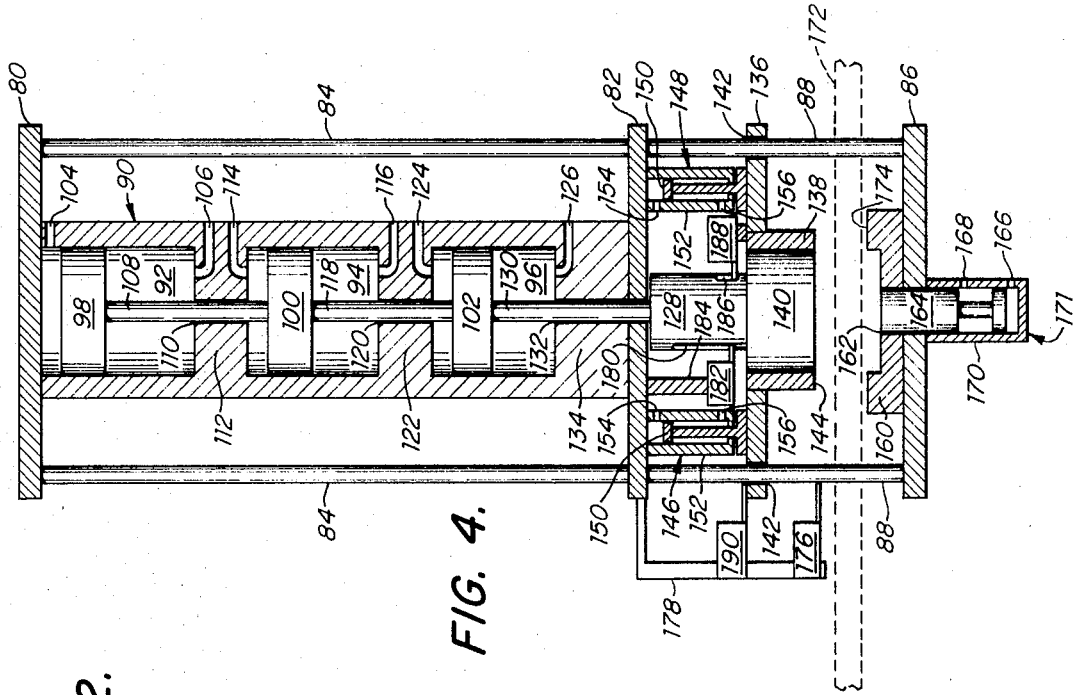

INVENTOR
WILFRED J. GRENIER

INVENTOR
WILFRED J. GRENIER
BY
ATTORNEY

SHEET METAL TWO-PART VALVE HOUSING

BACKGROUND OF INVENTION

This invention relates to a two-part sheet metal valve housing and an apparatus and method for making it.

Conventional valve housings made by casting and machining are relatively heavy, thick walled, and expensive to make. Further, such housings are porous and are often weak in tensile strength. Machined valve housings are expensive because of the high cost of machine stock, the labor costs involved in machining, and the metal wasted in the machining operations. When high strength housings are desired, the hardness of the machine stock often requires annealing before a machining operation can be performed on it. Machine stock and valve housings made therefrom tend to have some porosity and the grain of the metal in the finished housing is not continuous. For example, assume a housing machined from a piece of bar stock with longitudinal metal grain structure, so that the central axis of the housing is parallel to the direction of the grain. Then housing walls parallel to the axis have a grain parallel to the axis, and oppose expansion caused by internal valve pressure with the tensile strength of the metal. But housing walls perpendicular to the central axis of the housing also have a grain parallel to the axis so that their grain is aligned parallel to an expansion force from internal valve pressure and they must oppose that force with the shear strength of the metal which is generally much less than the tensile strength. Walls at intermediate angles to the expansion force oppose with varying degrees of shear and tensile strength. Therefore, such valves require thicker walls in order to insure sufficient shear strength to oppose internal pressures. Cast metal valves are highly porous, are weak in both shear and tensile strength, and have substantially no continuous grain structure. Their main strength is in compression. To attempt to combat the high porosity and weakness these types of valves are made with walls that are quite thick: often two or more times as thick as walls in machined valves for withstanding similar pressure conditions. In addition, cast valves, as wholly machined valves, require precision machining operations to size the valve and to provide a smooth finish to the valve. Both cast and machined valves may receive hardening operations to increase their strength and decrease their porosity.

SUMMARY OF INVENTION

It is therefore a primary object of this invention to provide a metal valve housing having high tensile strength, low porosity and a continuous grain aligned with the contours of the housing.

It is a further object of this invention to provide such a valve housing which may be stamped from sheet metal in two parts.

It is a further object of this invention to provide such a valve housing which can withstand approximately twice the pressure of a machined valve and four times the pressure of a cast valve with the same wall thickness.

It is a further object of this invention to provide such a valve housing having substantially no porosity.

It is a further object of this invention to provide such a valve which is lighter, stronger, less expensive, and less porous than equivalent size cast or machined valves.

It is a further object of this invention to provide a process and apparatus for making such a valve whereby the metal need not be annealed for working, whereby the metal hardness is inherently increased by 50 percent or more, and whereby a properly sized and finished valve housing is produced without machining.

It is a further object of this invention to provide such a process and apparatus resulting in a valve housing having a smoothness of finish in the range of 4 to 60 lines per microinch.

It is a further object of this invention to provide such an apparatus having a variable power hydraulically powered press for smoothly applying the optimum force to form the valve parts.

It is a further object of this invention to provide such an apparatus having a plurality of such presses arranged for synchronous operation with a transfer mechanism so that the parts can be formed without need for annealing.

The invention features a two-part sheet metal valve housing including a main body part and a closure part. The main body part includes a first portion for connection with a passage whose fluid flow is to be controlled, a second enlarged portion for receiving the valving mechanism, and a third portion for engaging the other part of the housing. The metal grain is continuous and is aligned with the contour of the main body through all of its portions. The closure part includes a first section for connection with a passage whose fluid flow is to be controlled, a second section for closing one end of the second portion of the main body part, and a third section for engaging with the third portion of the main body part for joining the two parts. The metal grain is continuous and is aligned with the contour of the closure part through all of its sections. The invention also features an apparatus for and method of making such a valve.

Other objects, features and advantages will occur from the following description of a preferred embodiment and the accompanying drawings, in which:

FIG. 1 is an exploded axonometric view of a two-part valve housing according to this invention.

FIG. 2 is a cross-sectional view of a two-part valve housing joined together according to this invention showing the continuous grain structure aligned with the contours of the parts.

FIG. 3 is a cross-sectional view of a two-part valve housing joined together according to this invention with a ball valve mechanism in it.

FIG. 4 is a cross-sectional diagrammatic view of a press for stamping a part of the valve housing.

Figure 5:
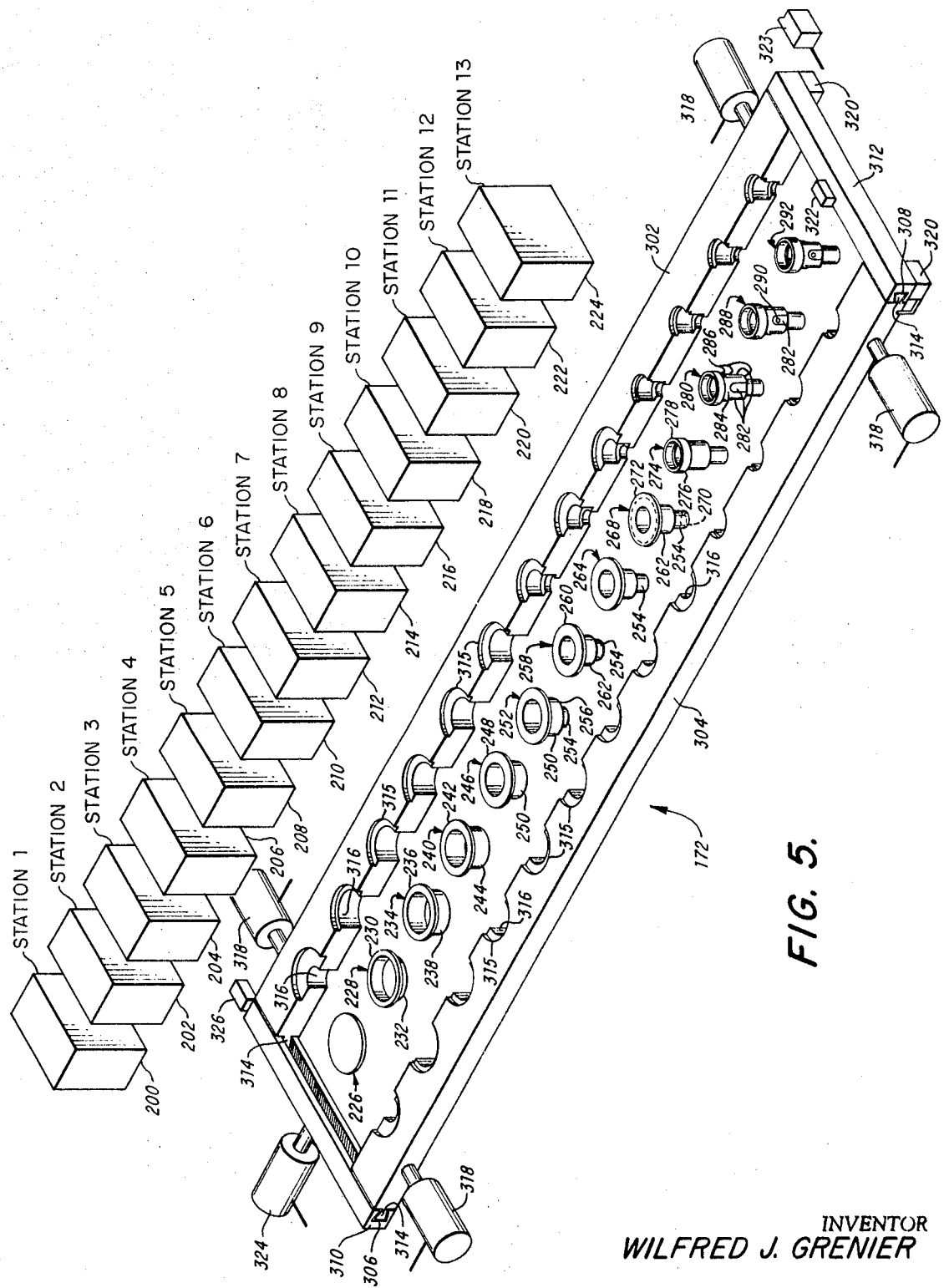
FIG. 5 is a block diagram of a transfer press for stamping the main body part of the valve housing showing the transfer mechanism and in block form 13 presses similar to that of FIG. 4, accompanied by a representation of the from of the part at each of those stations.

A sheet metal valve housing according to this invention shown in FIG. 1 includes a main body part, top part 10, and a closure part, bottom part 12. Bottom part 12 includes an annular portion 14 with a central circular aperture 16 connected with a cylindrical portion 18 which is adapted for connection with a pipe or other conduit fluid flow through which the valve is to control. Top part 10 includes a cylindrical portion 20 adapted for connection with a pipe or other conduit, a central portion 22 including a shoulder 24 generally perpendicular to the central axis 26 of the housing and an enlarged cylindrical portion 28 for receiving the valve mechanism. An annular rim or flange 30 extends sufficiently outward from portion 28 to enable it to be wrapped about annular portion 14 to unite the two parts and form the housing. A flat spot 32 and one on the opposite side (not shown) of part 10 may be provided to receive a wrench for tightening the complete housing to threaded conduit by means of internal or external threads on cylindrical portions 18, 20. A third flat spot 34 and an aperture 36 are provided in cylindrical portion 18 to receive a valve stem for operating the valve.

Since the valve-housing parts 10, 12 are made from sheet metal conformed to the desired shape, the grain, FIG. 2, indicated as dashed lines 40, everywhere follows the contours of the parts. Such grain alignment produces very high tensile strength of the parts which is a major factor in the housing's ability to withstand internal pressures that exert forces, arrows 42, perpendicular to the housing walls, and make the housing of this invention capable of withstanding higher pressures than cast and machined housings with walls of equal thickness. In addition the many radii 44 internal and external produced in forming the housing parts increase their resistance to internal pressures.

Although in FIG. 2 the valve parts 10, 12 are shown united to form the complete housing without a valve mechanism, more generally when united they contain a valve mechanism such as the flow through ball valve mechanism 46, shown in FIG. 3. Ball valve mechanism 46 includes an "O" ring 48 and seal 50 held in place by flange 30 when it is wrapped around annular portion 14, a second seal 52, the ball 54 shown in the open valve position, and an actuator assembly 56 having a valve stem 58, packing 60, washer 62, and handle 64 secured by nut 66.

The valve parts may be formed from sheet metal of from one-sixteenth inch to one-fourth inch in thickness capable of withstanding pressures of 4,000 to 40,000 pounds per square inch to make valves for accommodating lines of one-fourth to 12 inches in diameter using a punch and die in a hydraulically powered press, Fig. 4. The press may include two fixed square plates 80, 82 secured together by four bars 84 (two shown), and a third fixed square plate 86, secured to plate 82 by four bars 88 (two shown). A cylinder block 90 between plates 80, 82 contains three hydraulic cylinders 92, 94, 96 containing three pistons 98, 100, 102. Piston 98 in cylinder 92 driven downwardly by hydraulic pressure supplied through port 104 and upwardly by hydraulic pressure supplied through port 106 is connected to piston 100 by rod 108 passing through bore 110 in cylinder wall 112. Piston 100 in cylinder 94 driven downwardly by hydraulic pressure supplied through port 114 and upwardly by hydraulic pressure supplied through port 116 is connected to piston 102 by rod 118 passing through bore 120 in cylinder wall 122. Piston 102 in cylinder 96 driven downwardly by hydraulic pressure supplied through port 124 and upwardly by hydraulic pressure supplied through port 126 is connected to cylindrical member 128 by rod 130 passing through bore 132 in cylinder wall 134 and plate 82.

Slidably mounted on bars 88 is a square stripper plate 136 having a central cylindrical sleeve 138 that surrounds punch 140 connected to member 128 and four bores 142 (two shown) that receive bars 88. The lower edge 144 of sleeve 138 extends even with punch 140 when both the punch 140 and plate 136 are fully retracted as shown in FIG. 4. Plate 136 is driven by hydraulic drives 146, 148 each of which contains a piston 150 movable with plate 136 and a cylinder 152 attached to plate 82. Plate 136 is moved downwardly when hydraulic pressure is applied to ports 154 and upwardly when hydraulic pressure is applied to ports 156.

Mounted on plate 86 is a die 160 with a central bore 162 extending through plate 86 to receive ejector bar 164 driven upwardly to eject a workpiece from die 160 when hydraulic pressure is applied to port 166 and downwardly when hydraulic pressure is applied to port 168 of cylinder 170 of ejector drive 171.

Pistons 98, 100, 102 may be driven singly or in combination by the same hydraulic pressure of differing pressures. For example, ports 104, 114, 124 may simultaneously receive hydraulic fluid at a pressure of 100 lbs. per square inch to drive punch 140 down toward die 160 upon the receipt of a signal indicating that the transfer mechanism 172, a portion of which is shown in phantom in FIG. 4, has released the workpiece and is clear of the work area. Simultaneously with application of pressure to those ports, hydraulic pressure is applied to ports 154 of drives 146, 148 to move stripper plate 136 downwardly with punch 140. When the bottom of punch 140 and edge 144 of sleeve 138 reach the workpiece, not shown, whose edges overlap on to rim 174 of die 160, stripper plate 136 trips the stripper-down switch 176 supported on member 178 and the upper end of slot 180 in member 128 trips the punch down-up switch 182 supported on member 184. Signals from these switches stop drives 146 and 148 from moving stripper plate 136 further and increase the pressure applied at ports 104, 114, 124 to 10,000 lbs. per square inch to force punch 140 to seat in die 160. As punch 140 seats in die 160, the upper end of slot 186 trips the punch seated-retracted switch 188. A signal from switch 188 cuts off the pressure of 10,000 lbs. per square inch at ports 104, 114, 124 and applies a reversing pressure of 1,000 lbs. per square inch to ports 106, 116, 126 to retract punch 140 and simultaneously cuts off the pressure applied at ports 154 and applies pressure at ports 156. As a result punch 140 and plate 136 retract together with punch 140 protruding below edge 144 a distance equal to its penetration into die 160. When stripper plate 136 returns to the fully retracted position shown in FIG. 4, it trips the stripper-up switch 190 supported on member 178. Punch 140 having been retracted with plate 136 trips the punch down-up switch 182 by means of the lower end of slot 180. The presence of signals from both switches 182 and 190 cuts off the reversing pressure at ports 156 of drives 146, 148 arresting further movement of plate 136, provides pressure to port 166 of ejector 170 to drive ejector bar 164 upward to dislodge a workpiece in die 160, and causes the transfer mechanism to close on the workpiece now being freed from the punch and die. While this has occurred in response to the tripping of switch 190, punch 140 has continued to be retracted until it is once again flush with edge 144 whereupon switch 188 is triggered by the lower edge of slot 186 in response to which pressure at port 166 is cut off and pressure is applied to port 168 to retract ejector bar 164. The final movement of punch 140 retracting into sleeve 138 strips off any workpiece clinging to the punch so that the workpiece is free to be engaged by the closing transfer mechanism. The hydraulic press of FIG. 4 is suited to producing the valve housing parts because it is able to smoothly apply the correct amount of force to form each part without overstressing or under stressing the metal. This is so because the in-line, multicylinder arrangement facilitates tailoring the punch force to precisely that required.

The press of FIG. 4 may be but one of many similar presses used in a transfer press to make the two-part sheet metal valve housing. For example, The press of FIG. 4 may be one of thirteen presses 200, 202, 204, 206, 208, 210, 212, 214, 216, 218, 220, 222, 224, FIG. 5, each of which is one station of a transfer press for making the top part 10 of a valve housing, FIG. 1. Beneath each block representing a station comprising a press as shown in FIG. 4 is a representation of the workpiece as it appears after being worked at that station. Workpiece 226 at station 1 is the basic disc or blank punched from coil stock sheet metal by a punch and die such as punch 140 and die 160. Workpiece 228 at station 2 is the result of the first draw and includes a narrow rim 230 with a shallow cylindrical body 232. Workpiece 234 at station 3 is the result of a second draw and includes a wider rim 236 and cylindrical body 238 of medium depth. Workpiece 240 at station 4 is the result of a third draw and includes a rim 242 and a cylindrical body 244 of full depth. Workpiece 246 at station 5 is the result of a fourth draw that provides a wider rim 248 and a smaller properly sized cylindrical body 250. Workpiece 252 at station 6 is the result of a draw which creates a new cylindrical portion 254 and a shallow shoulder 256 in cylindrical portion 250. Workpiece 258 at station 7 is the result of a draw that provides a rim 260 and cylindrical portion 262 of reduced inner diameter and increases the length of new cylinder portion 254. Workpiece 264 at station 8 is the result of a draw that provides new cylindrical portion 254 of full depth. Workpiece 268 at station 9 is provided by piercing out the bottom of new cylindrical portion 254 to make a hole 270 and trimming the rim or flange 272. Workpiece 274 at station 10 is the result of forming the flange 276 with an upstanding portion 278. Workpiece 280 at station 11 is the result of drawing three flats 282 in the cylindrical portion 284, ironing the piece and reducing the radii 286 of all the bevels. Workpiece 288 at station 12 is the result of piercing a hole 290 in one of flats 282 for a valve stem. Workpiece 292 at station 13 is the result of a final ironing to precisely size the part and produce a smooth finish on the order of 4—60 lines per microinch.

The workpieces are transferred from station to station and are removed from the last station by transfer mechanism 172 including two transfer bars 302, 304 slidably mounted in groves 306, 308 in end bars 310, 312 for lateral motion toward and away from each other and the workpieces by means of four slides 314 (only three shown), one at each end of each transfer bar 302, 304. Each transfer bar 302, 304 contains 13 recesses 315 shaped to conform to the workpiece produced at a particular station including a bore 316 at station 1 to accommodate an ejector bar, e.g., bar 164, FIG. 4, which may be in the process of being retracted as the transfer bars close on the workpieces. Transfer bars 302, 304 are driven together to engage the workpieces and apart to release them by transfer-bar-close-and-open solenoids 318 mounted on means not shown. When fully apart bars 302, 304 trip the transfer-bars-open switches 320 and when fully closed they trip the transfer-bars-closed switches 322. When the bars are closed, the transfer-bars-forward-and-reverse solenoid 324 moves the four bars 310, 312, 302, 304, mechanism 172 forward to where bar 312 trips the transfer-bars-forward switch 323. When the transfer bars have been opened solenoid 324 reverses the motion of mechanism 172 until the transfer-bars-back switch 326 is tripped.

Figure 6:
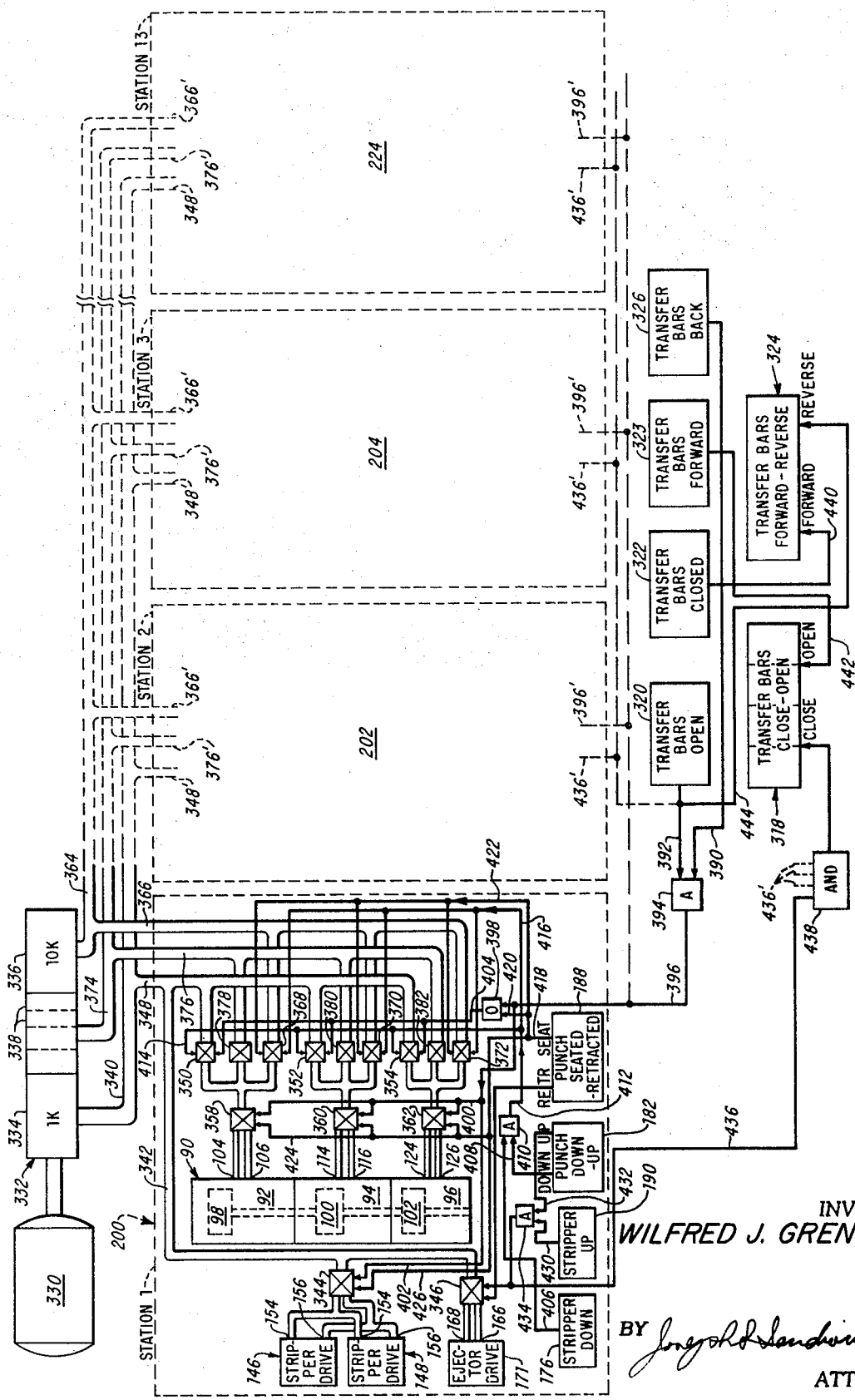
FIG. 6 is a control system for synchronously driving the presses and transfer mechanism of FIGS. 4 and 5.

A control system for synchronously operating the 13 station transfer press of FIG. 5, utilizing presses such as shown in FIG. 4, with the transfer mechanism 172 of FIG. 5 is shown in part in FIG. 6 where like parts shown in block form have been designated by the same numbers as in FIGS. 4 and 5. A motor 330 drives a multisection pump 332 having a 1,000 lbs. per square inch pressure section 334, 10,000 lbs. per square inch pressure section 336, or an additional pressure section such as section 338. The output from section 334 is delivered via main line 340 through line 342 to reversing valve 344 serving stripper drives 146, 148, to reversing valve 346 serving ejector drive 171, and through line 348 to selector valves 350, 352, 354 connected to reversing valves 358, 360, 362, respectively. The output from section 336 is delivered via main line 364 through line 366 to selector valves 368, 370, 372 also connected to reversing valves 358, 360, 362. The output from section 338 is delivered via main line 374 through a line 376 to selector valves 378, 380, 382 also connected to reversing valves 358, 360, 362.

In the press at station 1 a pressure of 1,000 lbs. per square inch is used to drive the stripper plate 136, ejector bar 164, and the punch 140 in both directions except for the power stroke of the punch which is driven by 10,000 lbs. per square inch. Similarly, pressure is supplied to each of the remaining stations 202, 204, 206, 208, 210, 212, 214, 216, 218, 220, 222, 224 through lines 348', 376', 366'.

In operation when the transfer-bars-back switch 326 and the transfer-bars-open switch 320 are tripped, signals appear on both input lines 390, 392 to AND circuit 394 resulting in an output; on line 396 to OR circuit 398 to provide a signal on line 404 to open selector valves 350, 352, 354 to provide a pressure of 1,000 lbs. per square inch at reversing valves 358, 360, 362; on line 400 to set reversing valves 358, 360, 362 to direct hydraulic pressure to ports 104, 114, 124; and on line 402 to set reversing valve 344 to direct hydraulic pressure on line 342 to ports 154 of stripper plate drives 146, 148. Thus stripper plate 136 and punch 140 travel downwardly together until sleeve 138 rests on the workpiece on die 160. At that time the stripper-down switch 176 and punch-down switch 182 are tripped providing signals on both input lines 406, 408 to AND circuit 410 resulting in an output on line 412, which directs a signal on line 414 to close selector valves 350, 352, 354 cutting off the pressure of 1,000 lbs. per square inch at reversing valves 358, 360, 362, and directs a signal on line 416 to open selector valves 368, 370, 372 to provide pressure of 10,000 lbs. per square inch at reversing valves 358, 360, 362. The punch is now driven the final distance to set in the die and form the workpiece.

When the punch is seated, the punch seated-retracted switch 188 is tripped producing an output on line 418 which directs a signal on line 420 to OR circuit 398 to open selector valves 350, 352, 354; on line 422 to close selector valves 368, 370, 372; on line 424 to reversing valves 358, 360, 362 to stop application of pressure at ports 104, 114, 124 and apply the pressure to ports 106, 116, 126; and on line 426 to provide a signal to reversing valve 344 to switch application of pressure from ports 154 to ports 156. With the reversal of pressure to stripper drives 146, 148 and cylinders 92, 94, 96, punch 140 and stripper plate 136 are retracted together until the stripper-up switch 190 and the punch down-up switch 182 are tripped presenting signals on both input lines 430, 432 to AND circuit 434. The output from AND circuit 434 directs a signal to reversing valve 346 to apply pressure to port 166 of ejector drive 171, a signal on line 436 to one input of AND circuit 438 which receives at its other inputs signals on lines 436' of the same significance from stations 202, 204, 206, 208, 210, 212, 214, 216, 218, 220, 222, 224. When all inputs are present signifying that the work area is clear, a signal from AND circuit 438 directs the transfer-bar-close-and-open solenoid 318 to close the bars on the workpiece. The transfer-bars-closed switch 322 tripped by the closed bars engaging the workpiece provides a signal on line 440 to the transfer-bar-forward-and-reverse solenoid 324 to drive the bars forward so that each workpiece is advanced one station along the transfer press. The transfer-bars-forward switch tripped by the transfer mechanism 300 being in its full advanced position directs a signal on line 442 to direct the transfer-bars-close-and-open solenoids 318 to open the transfer bars and deposit the workpieces at the advanced stations. When the transfer bars are fully open a signal is directed on line 392 to AND circuit 394 and to the transfer-bar-forward-and-reverse solenoid 324 on line 444 to retract the transfer mechanism. When the transfer mechanism is fully retracted the transfer-bars-back switch 326 is tripped producing a signal on line 390 so that both inputs to AND circuit 394 are present and the cycle of operation begins again.

The signal on line 396 from AND circuit 394 is also present on each of lines 346' to initiate operation of each of the other stations 202, 204, 206, 208, 210, 212, 214, 216, 218, 220, 222, 224, each of which includes a similar control system. The pressures applied to each of the hydraulic drives 146, 148, 171, and three piston-cylinder arrangements 92, 98; 94, 100; 96, 102; at each station may be varied according to the force required to hold, work, strip, and eject the workpiece at each station. For example, using 1/16-inch thick sheet metal stock, the full 10,000 lbs. per square inch of pressure may be used at station one to punch the circular blank from the stock, while the remaining stations two through 12 each employ only 2,500 lbs. per square inch. Or if ¼-inch stock is used, the full 10,000 lbs. per square inch may be used at each station.

A press similar to that in FIG. 4 may be arranged in a transfer press system similar to that of FIG. 5 operated by a control system such as that of FIG. 6 to form the bottom part of the two-part valve housing in seven steps. The bottom part of the two-part valve housing may be formed using only the first seven stations of the transfer press of FIG. 5. Additional stations may be used for sizing and ironing to a prescribed finish as discussed in the description of the forming of the top part of the two-part valve housing.

A valve housing whose parts are made from sheet metal according to this invention initially may be capable of withstanding very high pressure dependent upon the strength of the sheet metal stock used. And after stamping the parts will have become stress hardened which may increase their strength by as much as 50 percent. Further, a valve so produced has low porosity as compared with machined or cast housings even though such sheet metal valves have considerably thinner walls. Valves made in accordance with this invention may be passed from station to station with an annealing operation because the transfer between the stations is done sufficiently quickly so that work hardening does not occur to a substantial degree.

Other embodiments will occur to those skilled in the art and are within the following claims:

What I claim is:

1. A two-part metal housing for a rotary ball valve mechanism comprising a sheet metal main body part, including a first generally cylindrical portion, a second enlarged portion for enveloping the ball mechanism including a generally cylindrical wall and a radial shoulder interconnecting said cylindrical wall and said first portion, the junction of said shoulder and said first portion producing a seat support for the ball mechanism, and a third annular flange portion radially extending from said second portion and curled over to engage the mating section of the other part of the valve housing in which the metal grain is continuous and is aligned with the contour of said main body through all of its portions; and a sheet metal closure part, including a first generally cylindrical section, and a second flange section radially extending from said first section closing one end of said second portion of said main body part and extending into the curled flange of said third portion for completing the valve housing and producing a second seat support for the ball mechanism, in which the metal grain is continuous and is aligned with the contour of said closure part through all of its sections and an aperture in said second enlarged portion for a stem of the rotary ball mechanism.